(12) United States Patent
Andrews et al.

(10) Patent No.: US 8,681,780 B2
(45) Date of Patent: Mar. 25, 2014

(54) ESTABLISHING ELECTRONICALLY AUTHENTICATED INTERNET VOICE CONNECTIONS

(75) Inventors: Scott M. Andrews, Carrara (AU);
Anthony B. Ferguson, Southport (AU);
David P. Moore, Mudgeeraba (AU);
John T. Robertson, Broadbeach (AU)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 12/370,127

(22) Filed: Feb. 12, 2009

(65) Prior Publication Data

US 2010/0202596 A1 Aug. 12, 2010

(51) Int. Cl.
*H04L 12/66* (2006.01)
*H04M 1/56* (2006.01)
*H04M 15/06* (2006.01)
*H04L 9/32* (2006.01)

(52) U.S. Cl.
USPC ............ 370/352; 379/142.05; 713/168

(58) Field of Classification Search
USPC .......... 370/252, 352–356; 713/168, 171–173; 379/142.05
See application file for complete search history.

(56) References Cited

U.S. PATENT DOCUMENTS

| 8,194,651 | B2 * | 6/2012 | Panagopoulos et al. ...... 370/356 |
| 2003/0108161 | A1 | 6/2003 | Brown et al. |
| 2004/0260802 | A1 * | 12/2004 | Elsey et al. ................... 709/223 |
| 2005/0240671 | A1 | 10/2005 | Beyer et al. |
| 2006/0143705 | A1 * | 6/2006 | Sentoff ........................ 726/19 |
| 2007/0118750 | A1 | 5/2007 | Owen et al. |
| 2007/0133780 | A1 * | 6/2007 | Berner et al. ............ 379/265.01 |
| 2007/0156906 | A1 * | 7/2007 | Dowling ....................... 709/226 |
| 2007/0157026 | A1 * | 7/2007 | Zimmermann ............... 713/171 |
| 2007/0172063 | A1 * | 7/2007 | Biggs et al. ................... 380/255 |
| 2007/0198656 | A1 * | 8/2007 | Mazzaferri et al. ........... 709/218 |
| 2007/0220275 | A1 | 9/2007 | Heitzeberg et al. |
| 2008/0084870 | A1 * | 4/2008 | Taylor et al. ................... 370/352 |
| 2008/0086770 | A1 * | 4/2008 | Kulkarni et al. ................ 726/20 |
| 2008/0098225 | A1 * | 4/2008 | Baysinger ..................... 713/171 |
| 2008/0098464 | A1 * | 4/2008 | Mizrah ............................. 726/5 |
| 2008/0205627 | A1 * | 8/2008 | Reding et al. ............. 379/265.09 |
| 2008/0222712 | A1 * | 9/2008 | O'Connell et al. ............... 726/7 |
| 2009/0157523 | A1 * | 6/2009 | Jones et al. .................... 705/26 |
| 2009/0279682 | A1 * | 11/2009 | Strandell et al. ......... 379/201.02 |
| 2009/0288138 | A1 * | 11/2009 | Kalofonos ........................ 726/2 |
| 2009/0323670 | A1 * | 12/2009 | Altberg et al. ................ 370/352 |
| 2009/0328186 | A1 * | 12/2009 | Pollutro et al. ................. 726/13 |
| 2010/0031295 | A1 * | 2/2010 | Krzyzanowski et al. ....... 725/52 |
| 2011/0119376 | A1 * | 5/2011 | Bardsley et al. .............. 709/224 |
| 2011/0271114 | A1 * | 11/2011 | Baysinger ..................... 713/168 |

FOREIGN PATENT DOCUMENTS

WO WO-2007010541 1/2007

\* cited by examiner

*Primary Examiner* — Ayaz Sheikh
*Assistant Examiner* — Hoang-Chuong Vu
(74) *Attorney, Agent, or Firm* — Jeffrey S. LaBaw; David H. Judson

(57) ABSTRACT

An electronically authenticated internet voice connection can be initiated on an institution's website. Authentication of the customer's identity can be determined based upon already established credentials, such as a username and password. Upon verifying the identity of the customer, the institution's web server can generate and transmit a unique identifier to the customer's browser. The unique identifier can be an encrypted identifier used to authenticate the customer when establishing a subsequent voice connection.

19 Claims, 5 Drawing Sheets

201

| TRACKING COOKIE |
|---|
| 203 — NAME: AUDIO_AUTHENTICATION |
| 205 — VALUE: UNIQUE_IDENTIFIER_STRING |
| 207 — EXPIRES: MON 11 JAN 2009 00:00:00 GMT |
| 209 — DOMAIN: CREDITCARDACCOUNT.COM |
| 211 — PATH: "/AUDIOCONNECTION" |

FIG. 2

ESTABLISHING ELECTRONICALLY AUTHENTICATED INTERNET VOICE CONNECTIONS

BACKGROUND

Embodiments of the inventive subject matter generally relate to the field of internet voice communications, and, more particularly, to establishing electronically authenticated internet voice connections.

Many financial institutions (e.g., banks, credit card companies, insurance companies, etc) offer self-service information to customers via their company websites. Customers can log into online accounts to access transaction information, view statements, pay bills, etc. Sometimes customers want to speak to a customer service representative (CSR) about information shown in their online account. For example, a customer finds a transaction they do not recognize on an electronic credit card statement, so the customer calls a customer service phone number. When taking the call, the CSR verbally authenticates the customer's identity by asking the customer to provide shared secrets such as a mother's maiden name, the last four digits of the account holder's social security number, etc. The customer provided authentication information to the credit card company by logging into the online account with established credentials (e.g., a username and password) and by providing personal details during the call.

SUMMARY

Embodiments include a method directed to detecting a request from a browser to initiate an internet voice connection between a user computer and a service provider computer. In some embodiments, credentials associated with the user of the user computer can be received. The credentials may have been previously established. If the credentials are determined to be valid, a unique identifier including an encrypted key can be generated to authenticate the user for the internet voice connection. The unique identifier can be used to authenticate the user when establishing the internet voice connection. The unique identifier can be transmitted to the browser to cause the browser to invoke an audio application to establish the internet voice connection.

BRIEF DESCRIPTION OF THE DRAWINGS

The present embodiments may be better understood, and numerous objects, features, and advantages made apparent to those skilled in the art by referencing the accompanying drawings.

FIG. 2 is an example conceptual diagram of a tracking cookie containing a unique identifier.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to Voice over Internet Protocol (VoIP), embodiments may be implemented using other internet telephony protocols. In other instances, well-known instruction instances, protocols, structures, and techniques have not been shown in detail in order not to obfuscate the description.

Providing customer authentication information to a financial institution multiple times may increase the risk of compromising sensitive financial information. In addition, customers may not want to provide verbal identification during a phone call. For example, a customer's credit card may be declined at an airport restaurant. The customer may wish to speak with a CSR, but may not want to provide verbal authentication for fear of eavesdroppers. Some embodiments of the inventive subject matter allow the customer to initiate an electronically authenticated internet voice connection through a financial institution's website. First, the website can authenticate the customer's identity based upon already established credentials, such as a username and password. Upon verifying the identity of the customer, the financial institution's web server can generate and transmit a unique identifier to the customer's browser. A communications server can use the unique identifier (e.g., an encrypted key) to authenticate the customer when establishing the internet voice connection.

Figure 1:
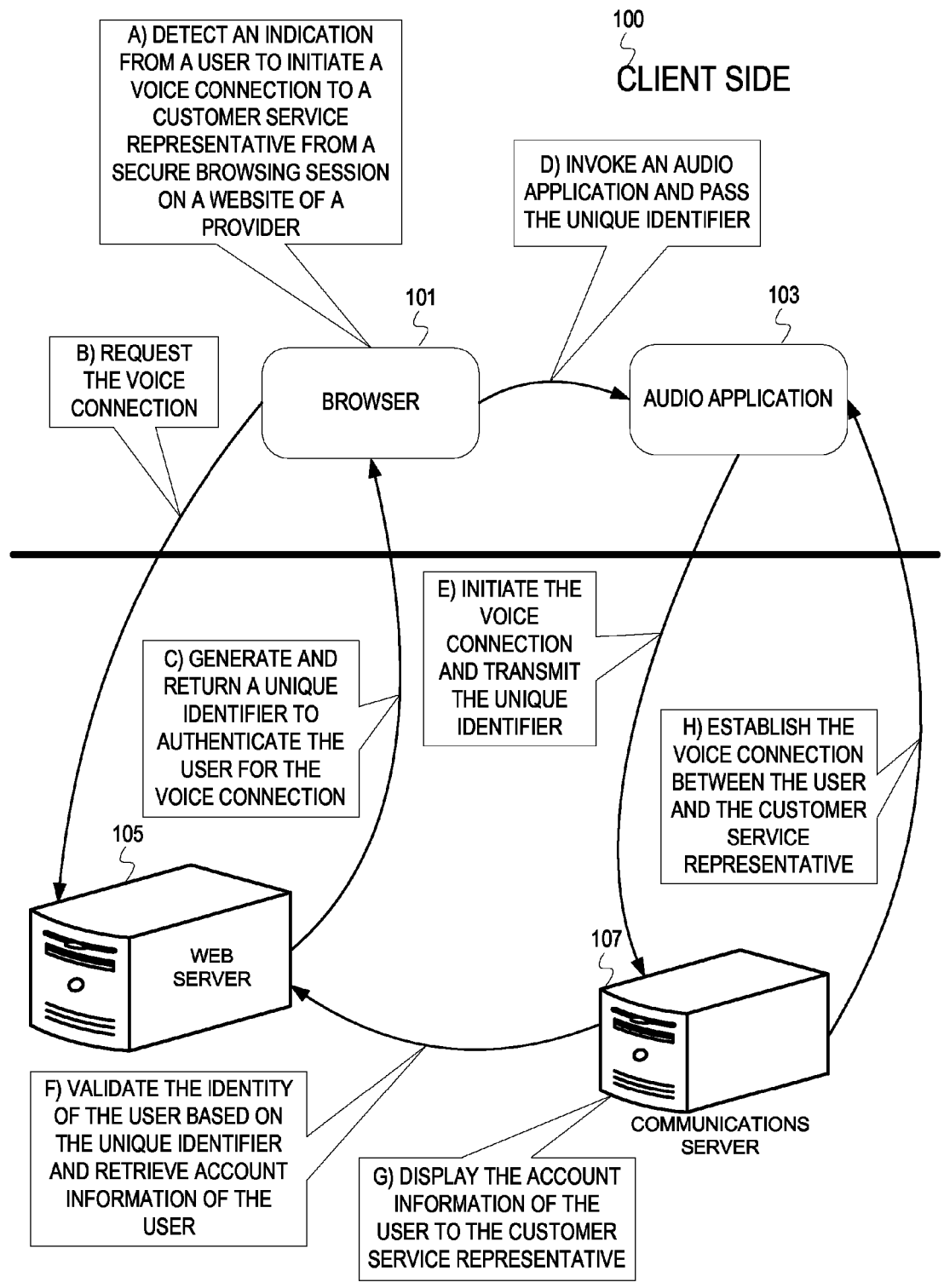
FIG. 1 is an example conceptual diagram of establishing an electronically authenticated voice connection.

FIG. 1 is an example conceptual diagram of establishing an electronically authenticated voice connection, according to some embodiments of the invention. A client side 100 comprises a browser 101, and an audio application 103. Although not shown, the browser 101 and audio application 103 can reside in a desktop computer or other suitable computing device (e.g., notebook computer, cell phone, personal digital assistant, etc.) Although the audio application 103 is depicted as a stand-alone application, the audio application 103 may be a browser plug-in. A provider side 104 comprises a web server 105, and a communications server. At stage A, the browser 101 detects an indication from a user to initiate a voice connection to a CSR from a secure browsing session on a provider website. For example, the user has logged into a bank account website to view transaction information on the user's account. The user may not recognize one of the transactions, so the user clicks a "Speak to a Representative" link. Other examples of providers include banks, credit card companies, insurance providers, brokerages, etc.

At stage B, the browser 101 requests the voice connection from the web server 105. In this example, the browser 101 detects the click on the "Speak to a Representative" link and sends, to the web server, a request for content associated with the link (e.g., a Hypertext Transfer Protocol (HTTP) request).

At stage C, the web server 105 generates a unique identifier to authenticate the user for the voice connection and returns the unique identifier to the browser 101. The identifier may have been generated and returned to the user during the initial successful establishment of the user's secure browsing session. The unique identifier can be an encrypted key used by the communications server 107 to authenticate the user when establishing the voice connection. In some embodiments, the web server 105 transmits a cookie containing the unique identifier to the browser 101.

At stage D, the browser 101 invokes the audio application 103 and passes the unique identifier to the audio application 103. The browser 101 may invoke the audio application in response to receiving content referenced by the "Speak to a Representative" link.

At stage E, the audio application 103 initiates the voice connection with the communications server 107 and transmits the unique identifier to the communications server 107. For example, the audio application 103 can send a Session Initiation Protocol (SIP) INVITE message to the communications server 107 to initiate a VoIP call.

At stage F, the communications server 107 validates the identity of the user based on the unique identifier and retrieves the user's account information from the web server 105. In this example, the communications server 107 verifies that the unique identifier received from the audio application 103 matches the previously generated unique identifier. An account identifier may be used to retrieve account information. In some examples, an account identifier is embedded within the unique identifier. The communications server 107 can determine the account identifier by parsing the unique identifier. In other examples, the unique identifier references the account identifier in a lookup table. The communications server 107 retrieves account information by performing a look-up of the unique identifier. In this example, the account information is retrieved from the web server 107. In other examples, the account information may be retrieved from another server such as an account server, a standalone storage device, etc.

At stage G, the communications server 107 displays the user's account information to the CSR. Account information may comprise the user's name, address, account balance, transaction information, etc.

At stage H, the communications server 107 establishes the voice connection between the user and the CSR. For example, the communications server 107 returns a SIP acknowledgement message to the audio application 103.

FIG. 2 is an example conceptual diagram of a tracking cookie containing a unique identifier. A tracking cookie 201 comprises a name 203, a value 205, an expiration date 207, a domain 209, and a path 211. The name 203 can by any string of characters. In this example, the name 203 is "Audio_authenticiation."

The value field 205 contains a unique identifier. The unique identifier may be generated based on account information. The unique identifier may be generated based on an account number. The unique identifier may also be generated randomly. The unique identifier may be encrypted using any encryption technique. In this example, the value 205 is "Unique_identifier_string." In addition, account information (e.g., an account number, a customer name, etc.) may be embedded in the unique identifier.

The expiration date 207 is the date that the tracking cookie should be deleted. In this example, the expiration date 207 is "Mon 11 Jan 2009 00:00:00 GMT."

The domain 209 is the domain that generated the tracking cookie. In this example, the domain 209 is "creditcardaccount.com."

The path 211 specifies a subset of Uniform Resource Locators (URLs) in the domain 209 for which the tracking cookie is valid. In this example, the path 211 is "/audioconnection."

Although examples refer to a web server transmitting unique identifiers in tracking cookies, embodiments are not so limited. For example, unique identifiers may be embedded in URL query strings or in other communications protocol objects. As another example, unique identifiers may be contained in hidden form fields.

Figure 3:
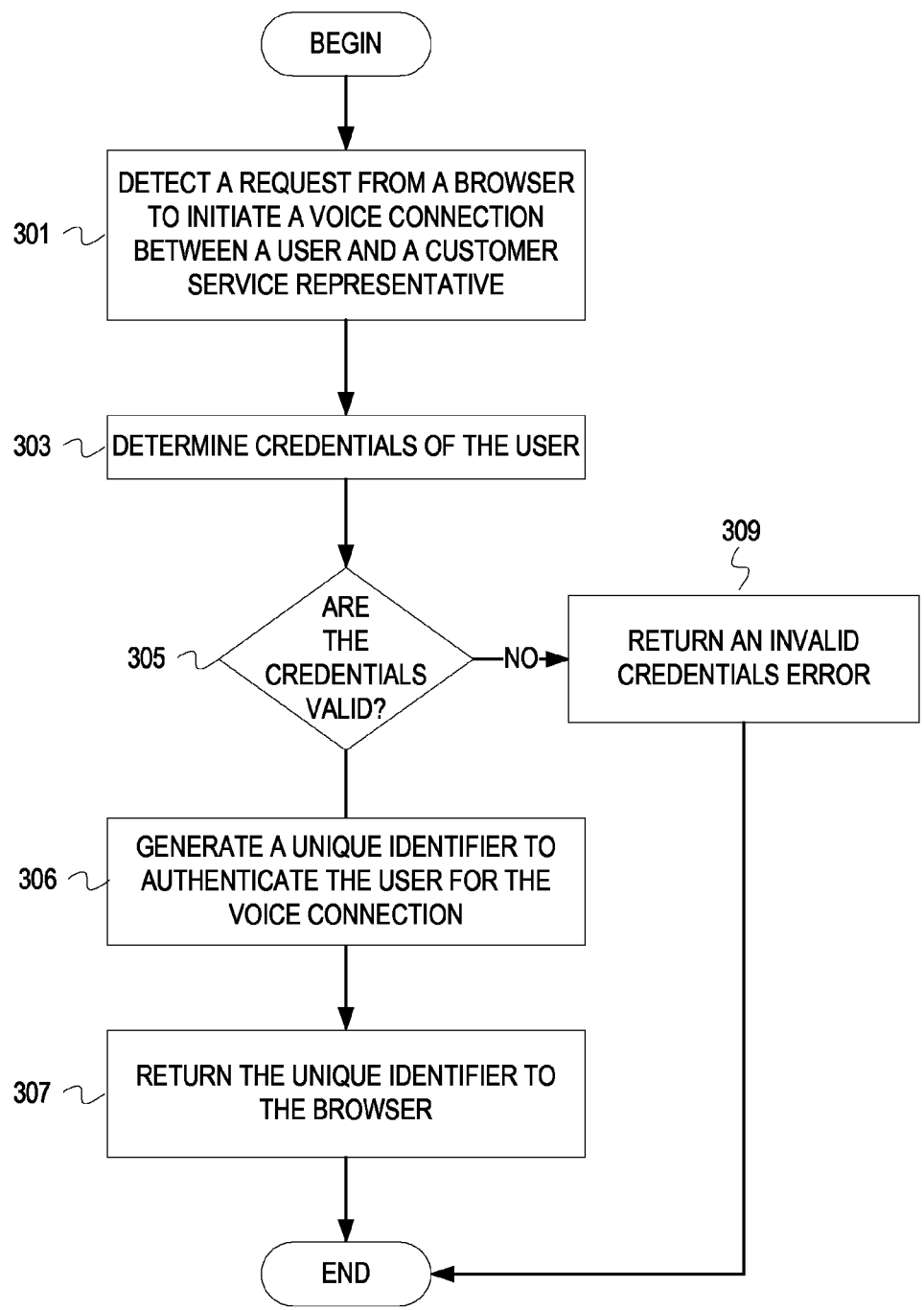
FIG. 3 is a flowchart depicting example operations for generating a unique identifier to authenticate a user for a voice connection.

FIG. 3 is a flowchart depicting example operations for generating a unique identifier to authenticate a user for a voice connection. Flow begins at block 301, where a web server detects a request from a browser to initiate a voice connection between a user and a CSR. For example, a user clicks on a "Contact Us" button on a webpage causing the browser to request content from the web server. Flow continues at block 303.

At block 303, the web server determines credentials of the user. For example, the web server prompts the user for a user name and password. As another example, the web server examines a tracking cookie sent by the browser with a content request. Flow continues at block 305.

At block 305, the web server determines if the credentials are valid. For example, the web server compares credentials submitted in response to a prompt to stored credentials. If the credentials are valid, flow continues at block 306. If the credentials are not valid, flow continues at block 309.

At block 306, the web server generates a unique identifier to authenticate the user for the voice connection. For example, generates the unique identifier based on the user's account number. Flow continues at block 307.

At block 307, the web server returns the unique identifier to the browser and flow ends. For example, the web server transmits a tracking cookie containing the unique identifier to the browser.

At block 309, the web server returns an invalid credentials error and flow ends.

Although examples refer to a web server generating a unique identifier in response to a browser request to initiate a voice connection, embodiments are not so limited. For example, the web server may generate the unique identifier when a user logs into an account. The unique identifier can authenticate the user during a secured browsing session on a website and for voice connections initiated from the website.

Figure 4:
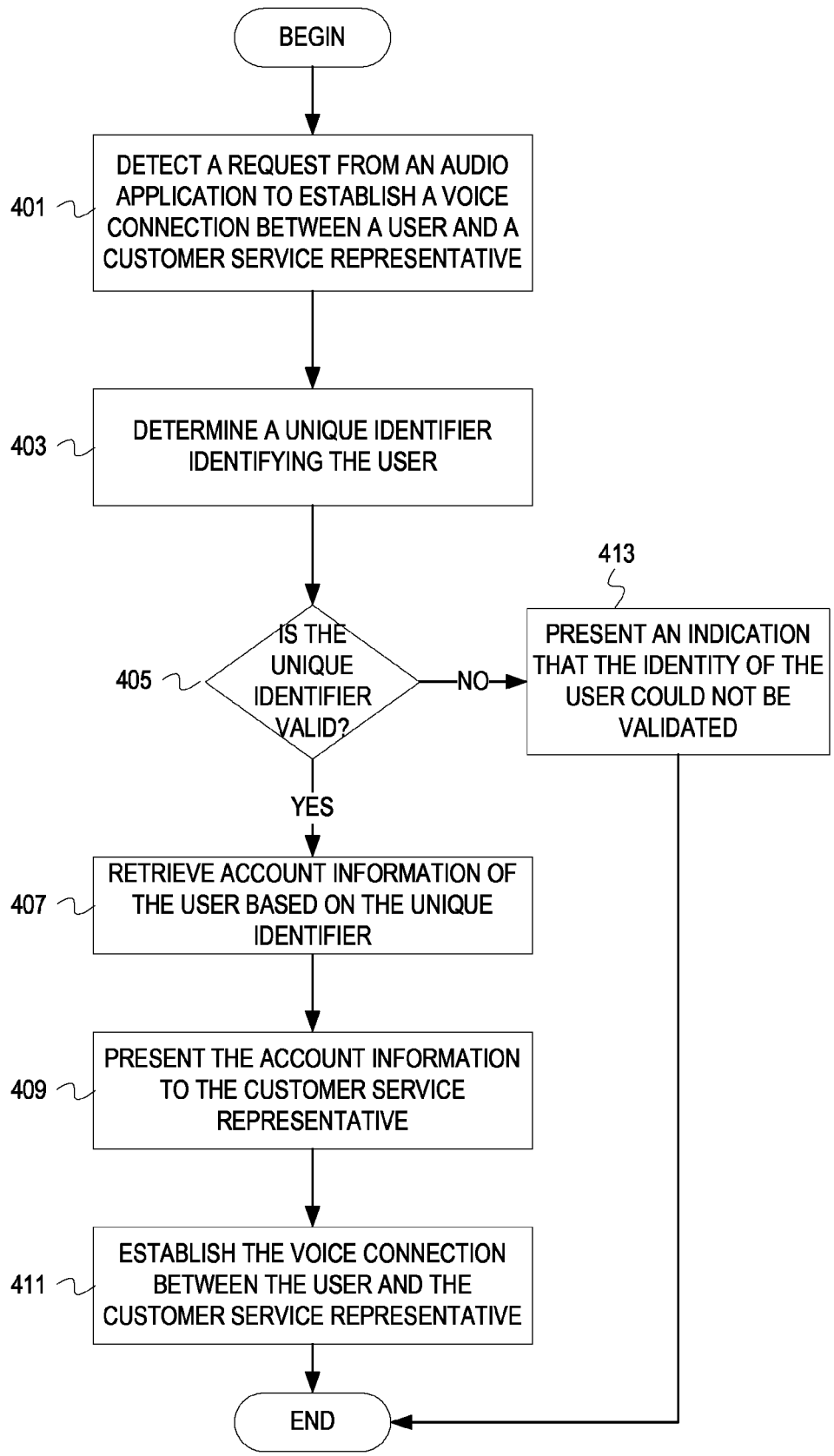
FIG. 4 is a flowchart depicting example operations for establishing an authenticated voice connection.

FIG. 4 is a flowchart depicting example operations for establishing an authenticated voice connection. Flow begins at block 401, where a communications server detects a request from an audio application to establish a voice connection between a user and a CSR. For example, the communications server receives a Media Gateway Control Protocol (MGCP) CreateConnection message from the audio application. Although examples refer to an audio application requesting to establish a voice connection, embodiments are not so limited. For example, a browser may establish the voice connection. In addition, the request to establish the voice connection may be sent to a web server by the audio application. In response, the web server may forward the request to the communications server. Flow continues at block 403.

At block 403, the communications server determines a unique identifier identifying the user. For example, the voice connection request includes the unique identifier. As another example, the communications server requests the unique identifier from the audio application. Flow continues at block 405.

At block 405, the communications server determines if the unique identifier is valid. Determining if the unique identifier is valid comprises decrypting the unique identifier and determining if the unique identifier matches a stored unique identifier. If the unique identifier is valid, flow continues at block 407. If the unique identifier is not valid, flow continues at block 413.

At block 407, the communications server retrieves account information of the user based on the identifier. The account information may be stored on the communications server, a second server, a stand-alone storage device, etc. In addition, the communications server 407 may also determine a reason for the requested voice connection to route the call to an appropriate CSR. For example, the communications server 407 may present a voice prompt allowing the customer to provide input to categorize the call. Flow continues to block 409.

At block 409, the communications server presents the account information to the customer service representative. For example, the communications server sends a message containing the account information to customer service management software running on the CSR's computer. Flow continues at block 411.

At block 411, the communications server establishes the voice connection between the user and the CSR and flow ends. For example, the communications server routes a SIP INVITE message to an audio application running on the CSR's computer. In response, the CSR's audio application sends an SIP acknowledgement message to the user's audio application.

At block 413, the communications server presents an indication that the identity of the user could not be validated and flow ends. For example, the communications server presents an audio message indicating the user could not be validated.

Although examples refer to establishing internet voice connections, embodiments are not so limited. For example, if a user does not have speakers and a microphone connected to his or her computer, an authenticated text chat session may be established instead of a voice connection.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 5:
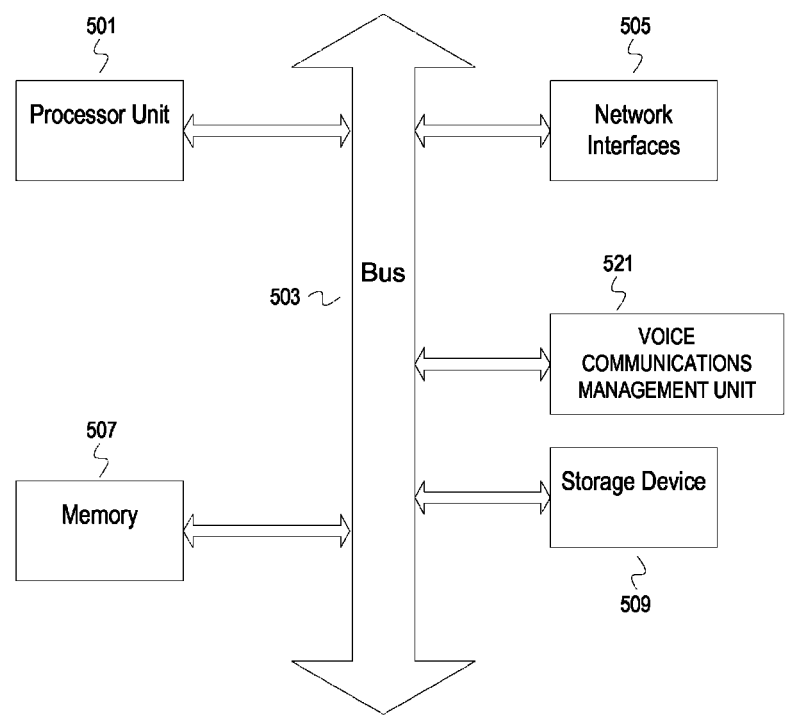
FIG. 5 depicts an example computer system.

FIG. 5 depicts an example computer system. A computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport®, InfiniBand®, NuBus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The computer system also includes a voice communications management unit 521 that detects requests for internet voice connections from a browser, generates a unique identifier to authenticate a user for the internet voice connection, and returns the generated unique identifier to the browser. The voice communications management unit 521 establishes the voice connection if a transmitted unique identifier from an audio application is valid. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

While the embodiments are described with reference to various implementations and exploitations, it will be understood that these embodiments are illustrative and that the scope of the inventive subject matter is not limited to them. In general, techniques establishing electronically authenticated internet voice connections as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer-implemented method for initiating an internet voice connection between a user computer and a service provider computer, the method comprising:

detecting a first request from a browser on the user computer, the first request to initiate an internet voice connection between the user computer and the service provider computer;

receiving credentials associated with a user of the user computer, wherein the credentials have been previously established;

determining that the credentials are valid;

generating a first unique identifier including an encrypted key, wherein the first unique identifier is distinct from the credentials and is for use in authenticating the user when establishing the internet voice connection;

transmitting the first unique identifier to the browser;

invoking an audio application from the browser to establish the internet voice connection and to automatically provide the first unique identifier in lieu of a verbal recitation of at least one credential by the user; and using the first unique identifier provided by the audio application in lieu of the verbal recitation of the at least one credential by the user to authenticate the user.

2. The method of claim 1, wherein said receiving credentials associated with the user of the user computer further comprises at least one of prompting the user for credentials, and examining a tracking cookie sent by the browser with the request, wherein the tracking cookie was transmitted to the browser at the beginning of a secure browsing session.

3. The method of claim 1, wherein said transmitting the first unique identifier to the browser to cause the browser to invoke an audio application to establish the internet voice connection further comprises at least one of transmitting a tracking cookie containing the first unique identifier to the browser, embedding the first unique identifier in a Uniform Resource Locator (URL) query string, and embedding the first unique identifier in a hidden form field.

4. The method of claim 1 further comprising:

detecting a second request to establish the internet voice connection;

determining a second unique identifier, wherein the second unique identifier authenticates the user for the internet voice connection;

determining that the second unique identifier is valid;

retrieving account information of the user based on the second unique identifier;

presenting the account information, on the service provider computer, to a customer service representative; and establishing the internet voice connection between the user computer and the service provider computer.

5. The method of claim 4, wherein said determining the second unique identifier further comprises at least one of examining the second request for the second unique identifier, and requesting the second unique identifier.

6. The method of claim 4, wherein said determining that the second unique identifier is valid further comprises comparing the second unique identifier to the first unique identifier.

7. The method of claim 4, wherein said retrieving account information of the user based on the second unique identifier further comprises at least one of determining an account identifier from the second unique identifier, and searching a lookup table for the second unique identifier.

8. The method of claim 4, wherein presenting the account information, on the service provider computer, to a customer service representative further comprises routing a call to the service provider computer based on a reason for the call, wherein the reason is determined based on indication from the user.

9. The method of claim 4 further comprising:

detecting a third request to establish the internet voice connection;

determining a third unique identifier;

determining that the third unique identifier is not valid;

presenting an indication, on the user computer, that the identity of the user could not be validated.

10. One or more non-transitory machine-readable media having stored therein a program product, which when executed by a set of one or more processor units causes the set of one or more processor units to perform operations that comprise:

detecting a first request from a browser on a user computer, the first request to initiate an internet voice connection between the user computer and a service provider computer;

receiving credentials associated with a user of the user computer, wherein the credentials have been previously established;

determining that the credentials are valid;

generating a first unique identifier including an encrypted key, wherein the first unique identifier is distinct from the credentials and is for use in authenticating the user when establishing the internet voice connection;

transmitting the first unique identifier to the browser;

invoking an audio application from the browser to establish the internet voice connection and to automatically provide the first unique identifier in lieu of a verbal recitation of at least one credential by the user; and using the first unique identifier provided by the audio application in lieu of the verbal recitation of the at least one credential by the user to authenticate the user.

11. The non-transitory machine-readable media of claim 10, wherein said receiving credentials associated with the user of the user computer further comprises at least one of prompting the user for credentials, and examining a tracking cookie sent by the browser with the first request, wherein the tracking cookie was transmitted to the browser at the beginning of a secure browsing session.

12. The non-transitory machine-readable media of claim 10, wherein said transmitting the first unique identifier to the browser to cause the browser to invoke an audio application to establish the internet voice connection further comprises at least one of transmitting a tracking cookie containing the first unique identifier to the browser, embedding the unique identifier in a Uniform Resource Locator (URL) query string, and embedding the first unique identifier in a hidden form field.

13. The non-transitory machine-readable media of claim 10, wherein the operations further comprise:

detecting a second request to establish the internet voice connection;

determining a second unique identifier, wherein the second unique identifier authenticates the user for the internet voice connection;

determining that the second unique identifier is valid;

retrieving account information of the user based on the second unique identifier;

presenting the account information, on the service provider computer, to a customer service representative; and establishing the internet voice connection between the user computer and the service provider computer.

14. The non-transitory machine-readable media of claim 13, wherein said determining the second unique identifier further comprises at least one of examining the second request for the second unique identifier, and requesting the second unique identifier.

15. The non-transitory machine-readable media of claim 13, wherein said determining that the second unique identifier is valid further comprises comparing the second unique identifier to the first unique identifier.

16. The non-transitory machine-readable media of claim 13, wherein said retrieving account information of the user based on the second unique identifier further comprises at least one of determining an account identifier from the second unique identifier, and searching a lookup table for the second unique identifier.

17. The non-transitory machine-readable media of claim 13, wherein the operations further comprise:
 detecting a third request to establish the internet voice connection;
 determining a third unique identifier;
 determining that the third unique identifier is not valid;
 presenting an indication, on the user computer, that the identity of the user could not be validated.

18. An apparatus comprising:
 a set of one or more processing units;
 a network interface; and
 a voice communications management unit operable to,
  detect a first request from a browser on a user computer, the first request to initiate an internet voice connection between the user computer and a service provider computer;
  receive credentials associated with a user of the user computer, wherein the credentials have been previously established;
  determine that the credentials are valid;
  generate a first unique identifier including an encrypted key, wherein the first unique identifier is for use in authenticating the user when establishing the internet voice connection;
  transmit the first unique identifier to the browser;
  invoke an audio application from the browser to establish the internet voice connection and to automatically provide the first unique identifier in lieu of a verbal recitation of at least one credential by the user; and
  using the first unique identifier provided by the audio application in lieu of the verbal recitation of the at least one credential by the user to authenticate the user.

19. The apparatus of claim 18, wherein the voice connections management unit comprises one or more machine-readable media.

* * * * *